US007154382B2

(12) United States Patent
Cern

(10) Patent No.: US 7,154,382 B2
(45) Date of Patent: Dec. 26, 2006

(54) ARRANGEMENT OF INDUCTIVE COUPLERS FOR DATA COMMUNICATION

(75) Inventor: Yehuda Cern, Brookline, MA (US)

(73) Assignee: Ambient Corporation, Newton, MA (US)

( * ) Notice: Subject to any disclaimer, the term of this patent is extended or adjusted under 35 U.S.C. 154(b) by 222 days.

(21) Appl. No.: 10/971,412

(22) Filed: Oct. 22, 2004

(65) Prior Publication Data

US 2005/0062589 A1   Mar. 24, 2005

Related U.S. Application Data

(60) Continuation-in-part of application No. 10/320,306, filed on Dec. 16, 2002, now Pat. No. 6,897,764, which is a continuation of application No. 09/948,895, filed on Sep. 7, 2001, now Pat. No. 6,646,447, which is a division of application No. 09/752,705, filed on Dec. 28, 2000, now Pat. No. 6,452,482.

(60) Provisional application No. 60/198,671, filed on Apr. 20, 2000, provisional application No. 60/173,808, filed on Dec. 30, 1999.

(51) Int. Cl.
*G05B 11/01* (2006.01)
*H04M 11/04* (2006.01)

(52) U.S. Cl. .................. 340/310.11; 340/310.13; 340/310.16; 340/310.17; 340/310.18

(58) Field of Classification Search .......... 340/310.11, 340/310.13, 310.16, 310.17, 310.18
See application file for complete search history.

(56) References Cited

U.S. PATENT DOCUMENTS 4,004,110 A   1/1977   Whyte
4,016,429 A   4/1977   Vercellotti et al.
4,065,763 A   12/1977  Whyte et al.
4,142,178 A   2/1979   Whyte et al.
4,188,619 A   2/1980   Perkins
4,254,402 A   3/1981   Perkins
4,323,882 A   4/1982   Gajjar
4,357,598 A   11/1982  Melvin, Jr.
4,408,186 A   10/1983  Howell
4,433,284 A   2/1984   Perkins
4,433,326 A   2/1984   Howell
4,473,816 A   9/1984   Perkins
4,481,501 A   11/1984  Perkins
4,602,240 A   7/1986   Perkins et al.
4,644,321 A   2/1987   Kennon
4,668,934 A   5/1987   Shuey
4,675,648 A   6/1987   Roth et al.
4,709,339 A   11/1987  Fernandes
4,745,391 A   5/1988   Gajjar
4,772,870 A   9/1988   Reyes (Continued)

FOREIGN PATENT DOCUMENTS

EP          0 889 602      2/2000

(Continued)

OTHER PUBLICATIONS

European Search Report dated Nov. 26, 2004.

*Primary Examiner*—Donnie L. Crosland
(74) *Attorney, Agent, or Firm*—Ohlandt, Greeley, Ruggiero & Perle, LLP

(57) ABSTRACT

There is provided a system including (a) a first inductive coupler for coupling a data signal between a port of the first inductive coupler and a first subset of a plurality of electrically parallel conductors, and (b) a second inductive coupler for coupling the data signal between a port of the second inductive coupler and a second subset of the plurality of conductors. There are also provided methods for arranging such a system.

26 Claims, 8 Drawing Sheets

U.S. PATENT DOCUMENTS

| | | |
|---|---|---|
| 4,800,363 A | 1/1989 | Braun et al. |
| 4,903,006 A | 2/1990 | Boomgaard |
| 4,937,529 A | 6/1990 | O'Toole et al. |
| 5,066,939 A | 11/1991 | Mansfield, Jr. |
| 5,101,161 A | 3/1992 | Walsh et al. |
| 5,181,026 A | 1/1993 | Granville |
| 5,210,519 A | 5/1993 | Moore |
| 5,257,006 A | 10/1993 | Graham et al. |
| 5,260,659 A | 11/1993 | Flowerdew et al. |
| 5,301,208 A | 4/1994 | Rhodes |
| 5,351,272 A | 9/1994 | Abraham |
| 5,384,540 A | 1/1995 | Dessel |
| 5,404,127 A | 4/1995 | Lee et al. |
| 5,406,249 A | 4/1995 | Pettus |
| 5,424,710 A | 6/1995 | Baumann |
| 5,497,142 A | 3/1996 | Chaffanjon |
| 5,559,377 A | 9/1996 | Abraham |
| 5,581,229 A | 12/1996 | Hunt |
| 5,627,474 A | 5/1997 | Baudisch |
| 5,684,450 A | 11/1997 | Brown |
| 5,684,451 A | 11/1997 | Seberger et al. |
| 5,684,826 A | 11/1997 | Ratner |
| 5,691,691 A | 11/1997 | Merwin et al. |
| 5,694,108 A | 12/1997 | Shuey |
| 5,705,974 A | 1/1998 | Patel et al. |
| 5,717,685 A | 2/1998 | Abraham |
| 5,777,769 A | 7/1998 | Coutinho |
| 5,777,789 A | 7/1998 | Chiu et al. |
| 5,818,127 A | 10/1998 | Abraham |
| 5,844,949 A | 12/1998 | Hershey et al. |
| 5,856,776 A | 1/1999 | Armstrong et al. |
| 5,859,584 A | 1/1999 | Counsell et al. |
| 5,864,284 A | 1/1999 | Sanderson |
| 5,892,795 A | 4/1999 | Paret |
| 5,929,750 A | 7/1999 | Brown |
| 5,933,071 A | 8/1999 | Brown |
| 5,952,914 A | 9/1999 | Wynn |
| 5,977,650 A | 11/1999 | Rickard et al. |
| 5,982,276 A | 11/1999 | Stewart |
| 5,994,998 A | 11/1999 | Fisher et al. |
| 5,995,911 A | 11/1999 | Hart |
| 6,023,106 A | 2/2000 | Abraham |
| 6,031,700 A | 2/2000 | Yang |
| 6,037,678 A | 3/2000 | Rickard |
| 6,040,759 A | 3/2000 | Sanderson |
| 6,104,707 A | 8/2000 | Abraham |
| 6,144,292 A | 11/2000 | Brown |
| 6,154,488 A | 11/2000 | Hunt |
| 6,172,597 B1 | 1/2001 | Brown |
| 6,236,218 B1 | 5/2001 | Johansson et al. |
| 6,297,729 B1 | 10/2001 | Abali et al. |
| 6,297,730 B1 | 10/2001 | Dickinson |
| 6,300,881 B1 | 10/2001 | Yee et al. |
| 6,313,738 B1 | 11/2001 | Wynn |
| 6,317,031 B1 | 11/2001 | Rickard |
| 6,331,814 B1 | 12/2001 | Albano et al. |
| 6,404,773 B1 | 6/2002 | Williams et al. |
| 6,407,987 B1 | 6/2002 | Abraham |
| 6,449,348 B1 | 9/2002 | Lamb et al. |
| 6,452,482 B1 | 9/2002 | Cern |
| 6,529,120 B1 | 3/2003 | Bilenko et al. |
| 6,577,230 B1 | 6/2003 | Wendt et al. |

FOREIGN PATENT DOCUMENTS

| | | |
|---|---|---|
| EP | 0 978 952 | 2/2000 |

ARRANGEMENT OF INDUCTIVE COUPLERS FOR DATA COMMUNICATION

CROSS-REFERENCE TO RELATED APPLICATIONS

The present application is a continuation-in-part of U.S. patent application Ser. No. 10/320,306, filed on Dec. 16, 2002 now U.S. Pat. No. 6,897,764, which is a continuation of U.S. patent application Ser. No. 09/948,895 filed on Sep. 7, 2001, now U.S. Pat. No. 6,646,447, which is a divisional of U.S. patent application Ser. No. 09/752,705, filed on Dec. 28, 2000, now U.S. Pat. No. 6,452,482, which claimed priority of (a) U.S. Provisional Patent Application Ser. No. 60/198,671, filed on Apr. 20, 2000, and (b) U.S. Provisional Patent Application Ser. No. 60/173,808, filed on Dec. 30, 1999.

BACKGROUND OF THE INVENTION

1. Field of the Invention

The present invention relates to data communications. It is particularly suitable for power line communications (PLC) between locations having a common electrical distribution system.

2. Description of the Related Art

PLC, also known as Broadband Power Line (BPL), is a technology that encompasses transmission of data at high frequencies through existing electric power lines, i.e., conductors used for carrying a power current. Power current is typically transmitted through power lines at a frequency in the range of 50–60 hertz (Hz). In low voltage lines, power current is transmitted with a voltage between about 90 to 600 volts, and in medium voltage lines, power current is transmitted with a voltage between about 2,400 volts to 35,000 volts. The frequency of the data signals is greater than or equal to about 1 Megahertz (MHz), and the voltage of the data signal ranges from a fraction of a volt to a few tens of volts. Data communication can employ various modulation schemes such as amplitude modulation, frequency modulation, pulse modulation or spread spectrum modulation.

A basic element of PLC technology is an inductive coupler for coupling PLC signals to and from a power line. Inductive coupling is most effective where the RF impedance of the power line is minimized.

Since current can only flow through a closed circuit, or loop, a signal current flowing from one point to another over a wire must have a "return path" to close the loop. When power line communication between two locations is desired using an inductive coupler at each location, a return path impedance at radio frequencies should be minimized. In a power line topology in which a single conductor, i.e., wire, is used, the return path impedance includes the impedance of the wire between two locations, plus the sum of all other impedances in the return path. The impedances in the return path, including the RF impedance of shunt devices helping to complete the return path, may be high, relative to the inherent impedance of the wires themselves. A high RF impedance reduces the magnitude of signal current induced by an inductive coupler, thus increasing the signal attenuation between the two locations.

SUMMARY OF THE INVENTION

There is provided a system for providing communications paths with minimal attenuation by utilizing multiple paralleled conductors. A first embodiment of such a system includes (a) a first inductive coupler for coupling a data signal between a port of the first inductive coupler and a first subset of a plurality of electrically parallel conductors, and (b) a second inductive coupler for coupling the data signal between a port of the second inductive coupler and a second subset of the plurality of conductors.

Another embodiment of such a system includes a first inductive coupler installed on a first conductor for coupling a data signal between a port of the first inductive coupler and the first conductor, and a second inductive coupler installed on the first conductor for coupling the data signal between a port of the second inductive coupler and the first conductor. The first conductor is electrically parallel to a second conductor having neither of the first nor second inductive couplers installed thereon.

There is also provided a method for arranging such a system. In one aspect, the method includes (a) installing a first inductive coupler on a first subset of a plurality of electrically parallel conductors for coupling a data signal between a port of the first inductive coupler and the first subset, and (b) installing a second inductive coupler on a second subset of a plurality of electrically parallel conductors, for coupling the data signal between a port of the second inductive coupler and the second subset.

In another aspect, the method includes installing a first inductive coupler on a first conductor for coupling a data signal between a port of the inductive coupler and the first conductor, and installing a second inductive coupler on the first conductor for coupling the data signal between a port of the second inductive coupler and the first conductor. The first conductor is electrically parallel to a second conductor having neither of the first nor second inductive couplers installed thereon.

DESCRIPTION OF THE INVENTION

A system and method are provided for RF communications over two or more conductors that are electrically parallel to one another. Such an arrangement is common in power transmission lines such as medium voltage and high voltage overhead and underground lines, and in power distribution systems for multi-unit dwellings and high-rise buildings, to increase power current carrying capacity. Parallel conductors may carry a single phase, neutral or ground circuit.

Communication signals may be transmitted between communication devices at separate locations of a structure or group of structures through existing power lines feeding that structure or group. Parallel power conductors serve as low attenuation paths for RF signals. The system and method described herein allow communication signals to be sent between communication devices (such as modems) that are separately located on different areas or levels of a building.

Figure 1:
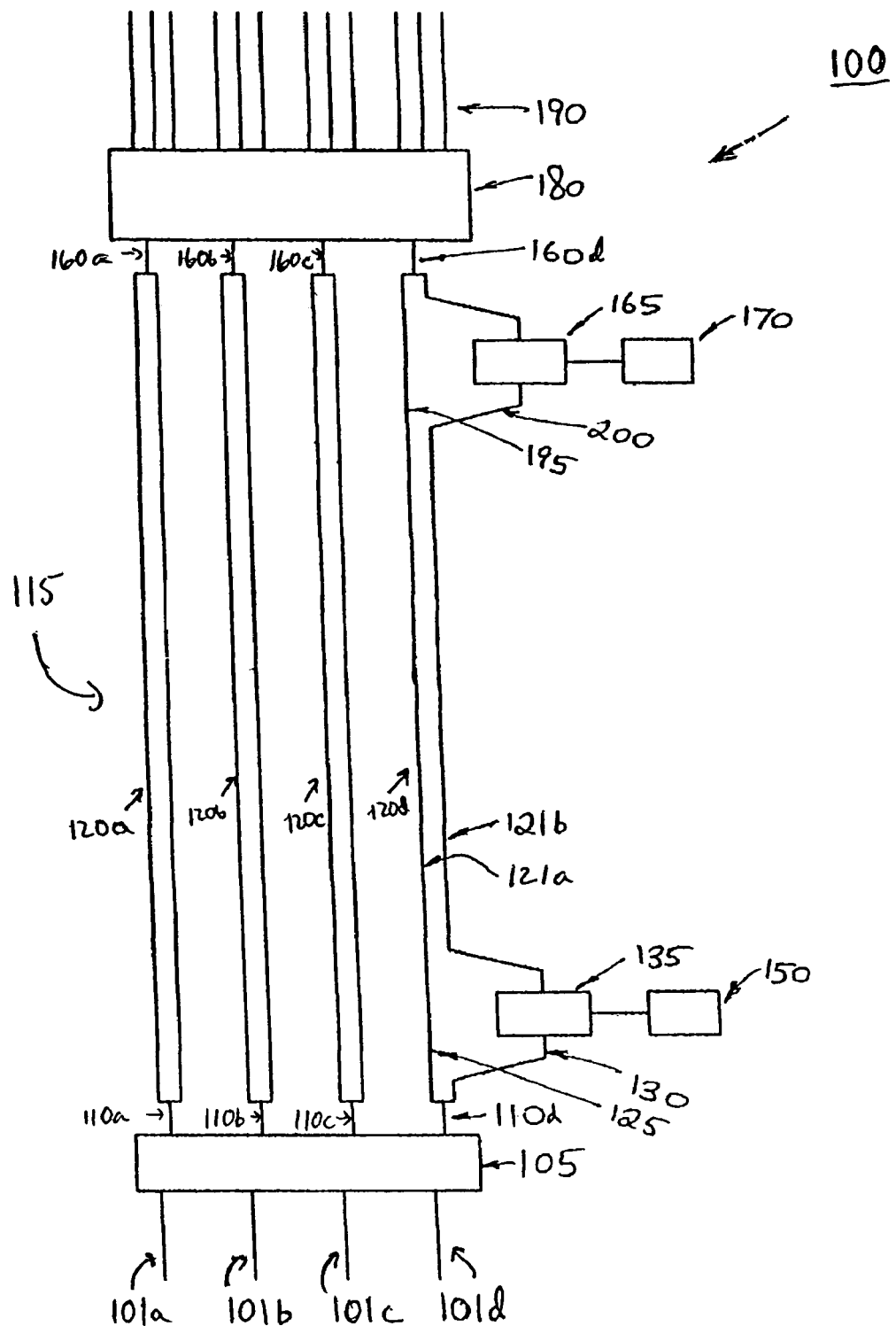
FIG. 1 is a drawing of a power circuit in a building having inductive couplers installed thereon for data communications.

FIG. 1 is a drawing of a power circuit in a building. An electrical distribution circuit 100 distributes power to various locations in the building (not shown). Power is provided to circuit 100 through phase conductors 101a, 101b and 101c, and through a neutral conductor 101d. Phase conductors 101a–101c and neutral conductor 110d may each be made of multiple conductors.

A fuse and switch panel 105 is electrically connected to phase conductors 101a–101c and neutral conductor 101d. Buss bars 110a, 110b, 110c and 110d receive power through fuse and switch panel 105 from phase conductors 101a, 101b, 101c and neutral conductor 101d, respectively.

A set of riser segments, hereinafter "riser set segment 115", is electrically connected to buss bars 110a–110d. Multiple riser set segments 115 may be included, however only one riser set segment 115 is shown. Riser set segment 115 includes rise conductor segments, hereinafter referred to as "riser segments 120a, 120b, 120c and 120d". Each of riser segments 120a–120d is formed by a plurality of conductors that are electrically parallel to one another. In FIG. 1, riser segments 120a–120d are each shown as having two electrically parallel conductors. For example, riser segment 120d is configured with conductors 121a and 121b. Any of riser segments 120a–120d may include more than two conductors.

At the top of riser set segment 115, such as on a higher floor of a building, riser segments 120a, 120b, 120c and 120d are connected to buss bars 160a, 160b, 160c and 160d, respectively. A feed distribution panel 180 receives power from buss bars 160a–d and distributes power to various loads such as multiple apartments (not shown) via wires 190.

Whereas conductors 121a and 121b are electrically parallel to one another, they form a loop. Conductor 121a includes an upper region 195 and a lower region 125. Conductor 121b includes an upper region 200 and a lower region 130.

An inductive coupler 135 is installed on conductor 121b at a location in region 130. An inductive coupler 165 is installed on conductor 121b at a location in region 200. Thus, inductive coupler 135 is installed at a first location on conductor 121b, and inductive coupler 165 is installed at a second location on conductor 121b. Conductor 121a has neither inductive coupler 135 nor inductive coupler 165 installed thereon. In practice, prior to installing inductive couplers 135 and 165, conductors 121a and 121b may need to be physically separated from one another along regions 130 and 200.

A communication device 150, such as a modem, is connected to inductive coupler 135, and a communication device 170 is connected to inductive coupler 165.

Figure 2:
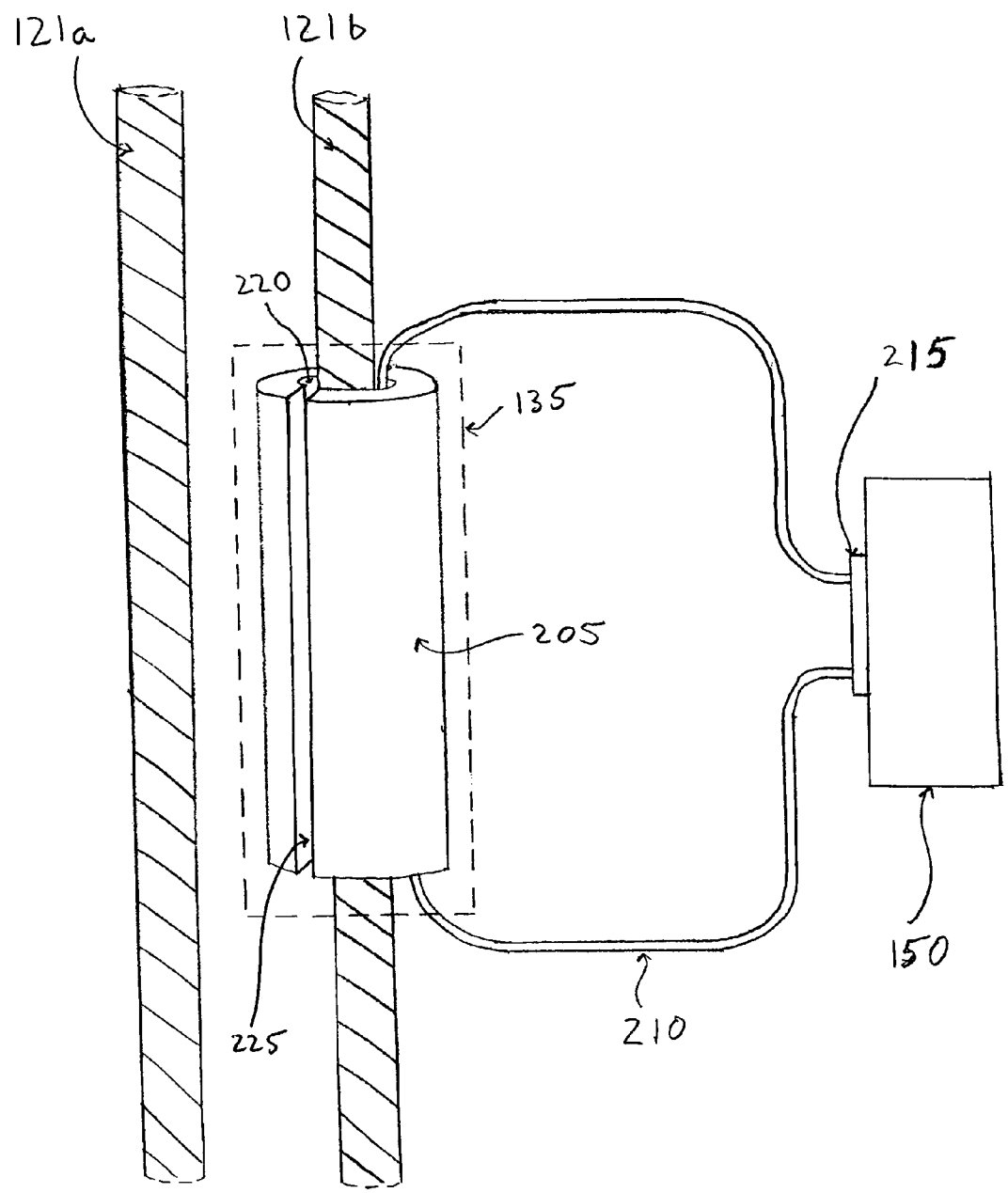
FIG. 2 is a drawing of an inductive coupler installed on one of a plurality of parallel conductors.

FIG. 2 shows inductive coupler 135 in greater detail. Inductive coupler 135 includes a magnetic core 205, a wire 210, and a port 215.

Magnetic core 205 is a split core, configured of two "C"-shaped sections that form an aperture 220 when situated adjacent to one another. A nonmagnetic gap such as an air gap 225 may be formed by inserting non-magnetic material between the sections of core 205 in a magnetic circuit of the core 205, thus increasing the capacity of inductive coupler 135 to function at high levels of power frequency current without significant magnetic saturation. Thus, by separating the two "C"-shaped sections, inductive coupler 135 can be installed onto or removed from conductor 121b. When inductive coupler 135 is installed onto conductor 121b, as shown in FIG. 2, conductor 121b is routed through aperture 220. Wire 210 is also routed through aperture 220, and terminates at port 215.

Inductive coupler 135 may be regarded as a transformer, where conductor 121b serves as a winding, and wire 210 serves as another winding. Here, conductor 121b is a one-turn winding, and wire 210 may also be a one-turn winding, or may be wound for several turns.

Inductive coupler 135 couples an RF signal between conductor 121b and port 215. Communication device 150 is connected to inductive coupler 135 via port 215. Thus, inductive coupler 135 enables communication of a data signal between conductor 121b and communication device 150.

Figure 3:
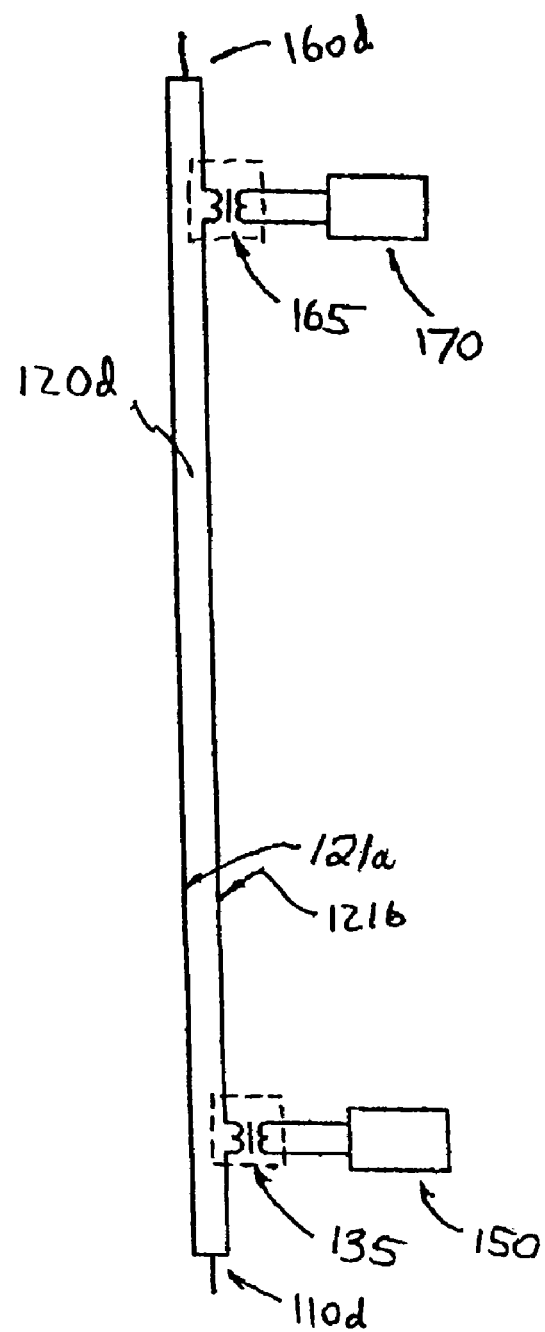
FIG. 3 is a schematic diagram of a portion of the circuit of FIG. 1.

FIG. 3 is a schematic of riser segment 120d. Conductors 121a and 121b are connected together at buss bars 110d and 160d, thus forming a loop. Inductive couplers 135 and 165 are clamped over conductor 121b, and communication of RF signals benefits from a relatively low impedance of the loop formed by riser segment 121b, buss bars 110d and 160d, and riser segment 120d.

Communication is conducted between communication devices 150 and 170 by transmission of data signals through riser segment 120d. This arrangement provides a very low attenuation path for signals between communication devices 150 and 170.

Figure 4B:
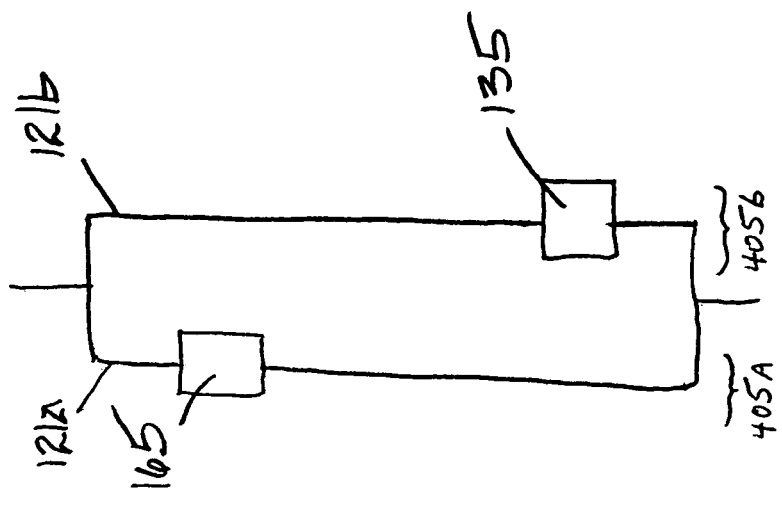
FIGS. 4A–4B are drawings showing several variations on the circuit of FIG. 1.
Figure 4A:
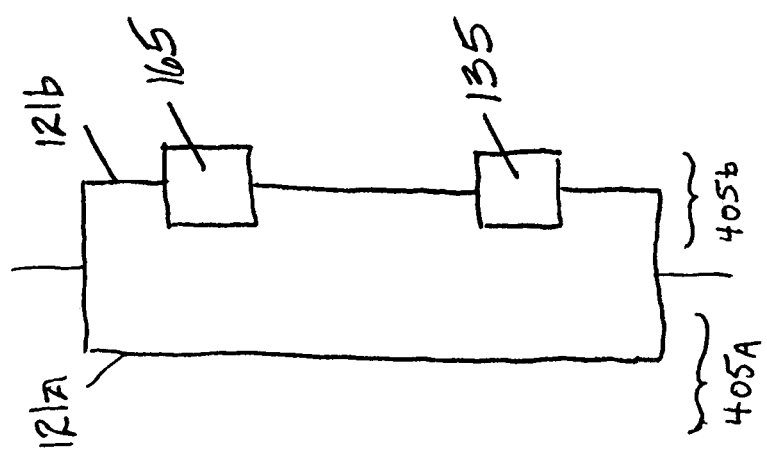

FIGS. 4A and 4B show exemplary embodiments of arrangements of inductive couplers 135 and 165 on subsets of a plurality of electrically parallel conductors. That is, conductors 121a and 121b form a plurality of electrically parallel conductors where conductor 121a is a subset 405a of the plurality of conductors, and conductor 121b is a subset 405b of the plurality of conductors. Subset 405a is complementary to subset 405b. That is, subsets 405a and 405b do not include any of the same conductors as one another, but a union of subsets 405a and 405b includes all of the conductors.

In FIG. 4A, inductive coupler 135 and inductive coupler 165 are both installed on conductor 121b, and so, they are both installed on the same subset, namely subset 405b. This configuration is similar to that of FIG. 1. Conductor 121a does not have either of inductive couplers 135 or 165 installed thereon. In use, for example in transmitting a communication signal from coupler 135 to coupler 165, a modem transmitter signal is first connected to a port of coupler 135. The modem transmitter signal induces a current in the loop formed by conductors 121b and 121a. The current in conductor 121b reaches coupler 165 and induces an output voltage at a port of coupler 165 connected to a second modem's receiver, producing a replica of the original data communications signal.

In FIG. 4B, inductive coupler 135 is installed on conductor 121b and inductive coupler 165 is installed on conductor 121a. Thus, inductive couplers 135 and 165 are installed on complementary subsets. In use, for example in transmitting a communication signal from coupler 135 to coupler 165, a modem transmitter signal is first connected to a port of coupler 135. The modem transmitter signal induces a current in the loop formed by conductors 121b and 121a. The current in conductor 121a reaches coupler 165 and induces an output voltage at a port of coupler 165 connected to a second modem's receiver, producing a replica of the original data communications signal.

FIGS. 5A–5D show alternatives to the configuration described in FIG. 1. Each of FIGS. 5A–5D show a plurality of conductors, namely three conductors 121*a*, 121*b* and 121*c*, which are electrically parallel to one another.

Figure 5B:
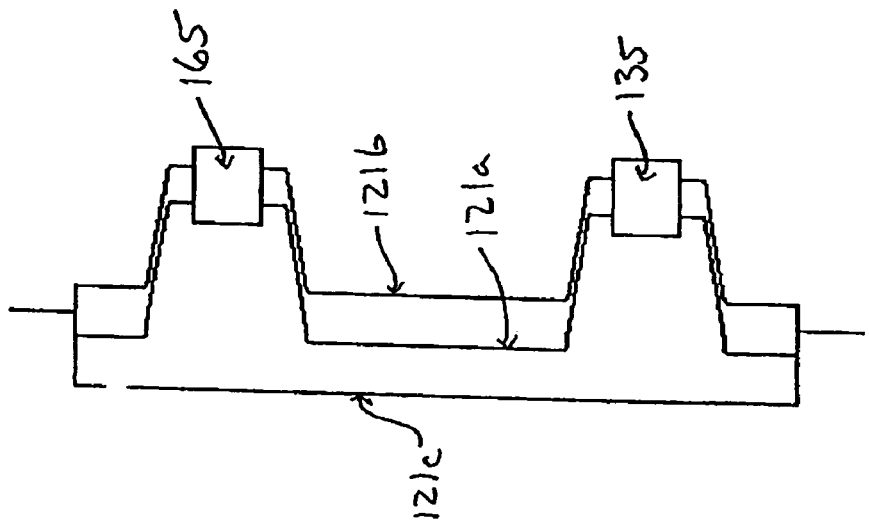
FIGS. 5A–5D are drawings showing additional variations on the circuit of FIG. 1.
Figure 5A:
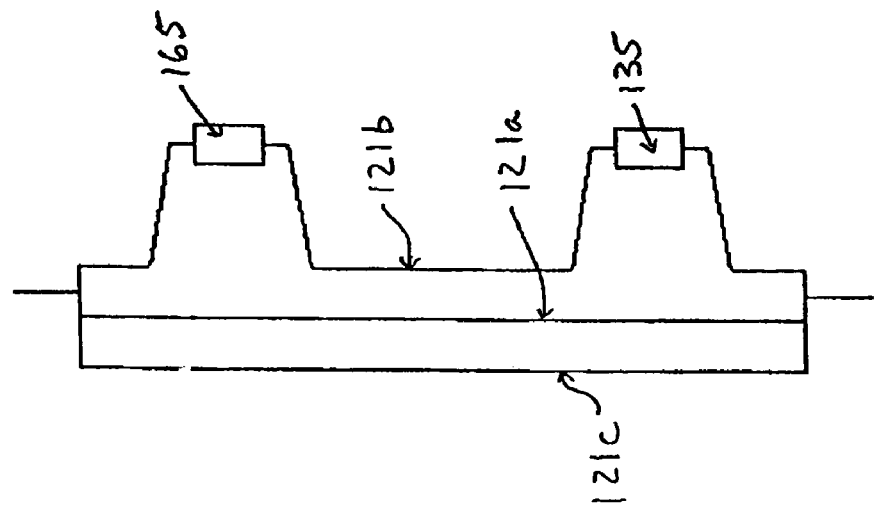

In FIG. 5A, inductive coupler 135 and inductive coupler 165 are both installed on conductor 121*b*. Conductor 121*a* does not have either of inductive couplers 135 or 165 installed thereon, and conductor 121*c* does not have either of inductive couplers 135 or 165 installed thereon. Conductor 121*b* is a subset of the plurality of conductors, and so, inductive couplers 135 and 165 are installed on the same subset. In use, for example in transmitting a communication signal from coupler 135 to coupler 165, a modem transmitter signal is connected to a port of coupler 135. The modem transmitter signal induces a current in the loop formed by conductors 121*a*, 121*b* and 121*c*. Current in conductor 121*b* reaches coupler 165, inducing an output voltage in coupler 165. The signal induced in coupler 165 travels through a port of coupler 165 to a second modem's receiver, producing a replica of the original data communications signal.

In FIG. 5B, inductive couplers 135 and 165 are each installed on both conductors 121*a* and 121*b*. Conductor 121*c* does not have either of inductive couplers 135 or 165 installed thereon. Conductors 121*a* and 121*b* form a subset of the plurality of conductors, and so, inductive couplers 135 and 165 are installed on the same subset. In use, for example in transmitting a communication signal from coupler 135 to coupler 165, a modem transmitter signal is connected to a port of coupler 135. The modem transmitter signal induces a current in the loop formed by conductors 121*a*, 121*b* and 121*c*. Currents in conductors 121*a* and 121*b* reach coupler 165, inducing an output voltage in coupler 165. The signal induced in coupler 165 travels through a port of coupler 165 to a second modem's receiver, producing a replica of the original data communications signal.

Figure 5D:
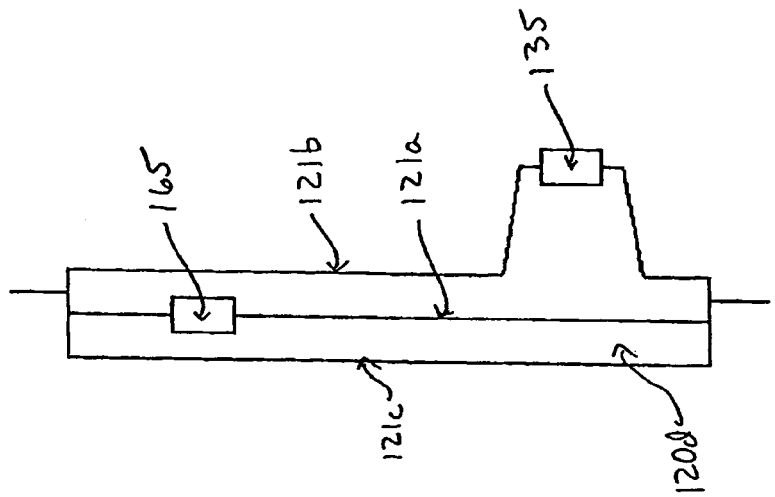
Figure 5C:
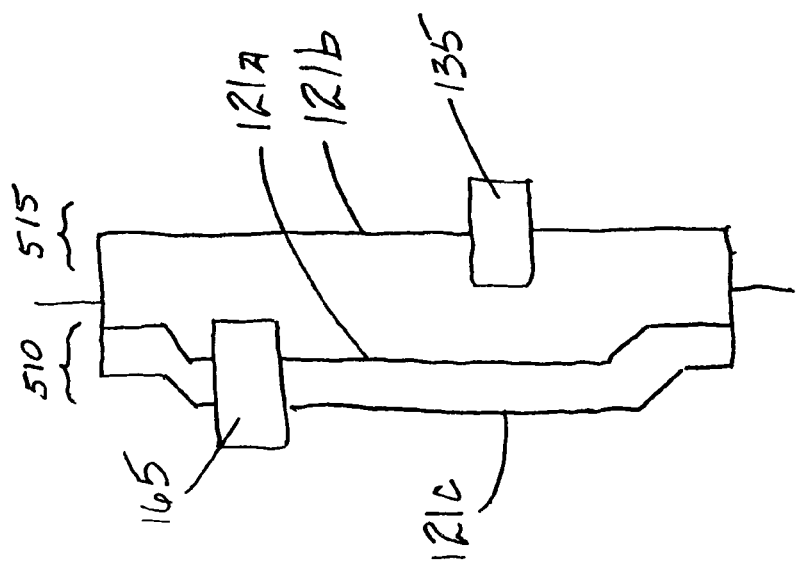

In FIG. 5C, inductive coupler 135 is installed on conductor 121*b*, and inductive coupler 165 is installed on conductors 121*a* and 121*c*. Conductor 121*b* forms a subset 515 of the plurality of conductors, and conductors 121*a* and 121*c* form a subset 510, which is complementary to subset 515. Thus, in FIG. 5C, inductive coupler 135 and inductive coupler 165 are installed on complementary subsets. In use, for example in transmitting a communication signal from coupler 135 to coupler 165, a modem transmitter signal is connected to a port of coupler 135. The modem transmitter signal induces a current in the loop formed by conductors 121*a*, 121*b* and 121*c*. Currents in conductors 121*a* and 121*c* reach coupler 165, inducing an output voltage in coupler 165. The signal induced in coupler 165 travels through a port of coupler 165 to a second modem's receiver, producing a replica of the original data communications signal.

In FIG. 5D, inductive coupler 135 is installed on conductor 121*b*, and inductive coupler 165 is installed on conductor 121*a*. Conductor 121*c* does not have either of inductive couplers 135 or 165 installed thereon. Conductor 121*b* forms a first subset of the plurality of conductors, and conductor 121*a* forms a second subset of the plurality of conductors. These subsets are neither the same as one another nor complementary. In use, for example in transmitting a communication signal from coupler 135 to coupler 165, a modem transmitter signal is connected to a port of coupler 135. The modem transmitter signal induces a current in the loop formed by conductors 121*a*, 121*b* and 121*c*. Current in conductor 121*a* reaches coupler 165, inducing an output voltage in coupler 165. The signal induced in coupler 165 travels through a port of coupler 165 to a second modem's receiver, producing a replica of the original data communications signal.

If there are more than two parallel conductors carrying a single power circuit, such as in FIGS. 5A–5D, then inductive coupler 135, or any other inductive coupler, may be installed on one conductor (as in FIG. 5A), two conductors (as in FIG. 5B) or any number of the conductors. Inductive couplers 135 and 165 may be coupled on the same conductor or conductors, or installed on different conductors or different subsets of the parallel conductors. Furthermore, each conductor of the plurality of conductors may be configured as a plurality of parallel conductors.

As is evident from FIGS. 4A, 4B and 5A–5D, a loop is maintained to preserve a low impedance path for communication signals. Communications signals can be readily transmitted along these low impedance paths.

Figure 6:
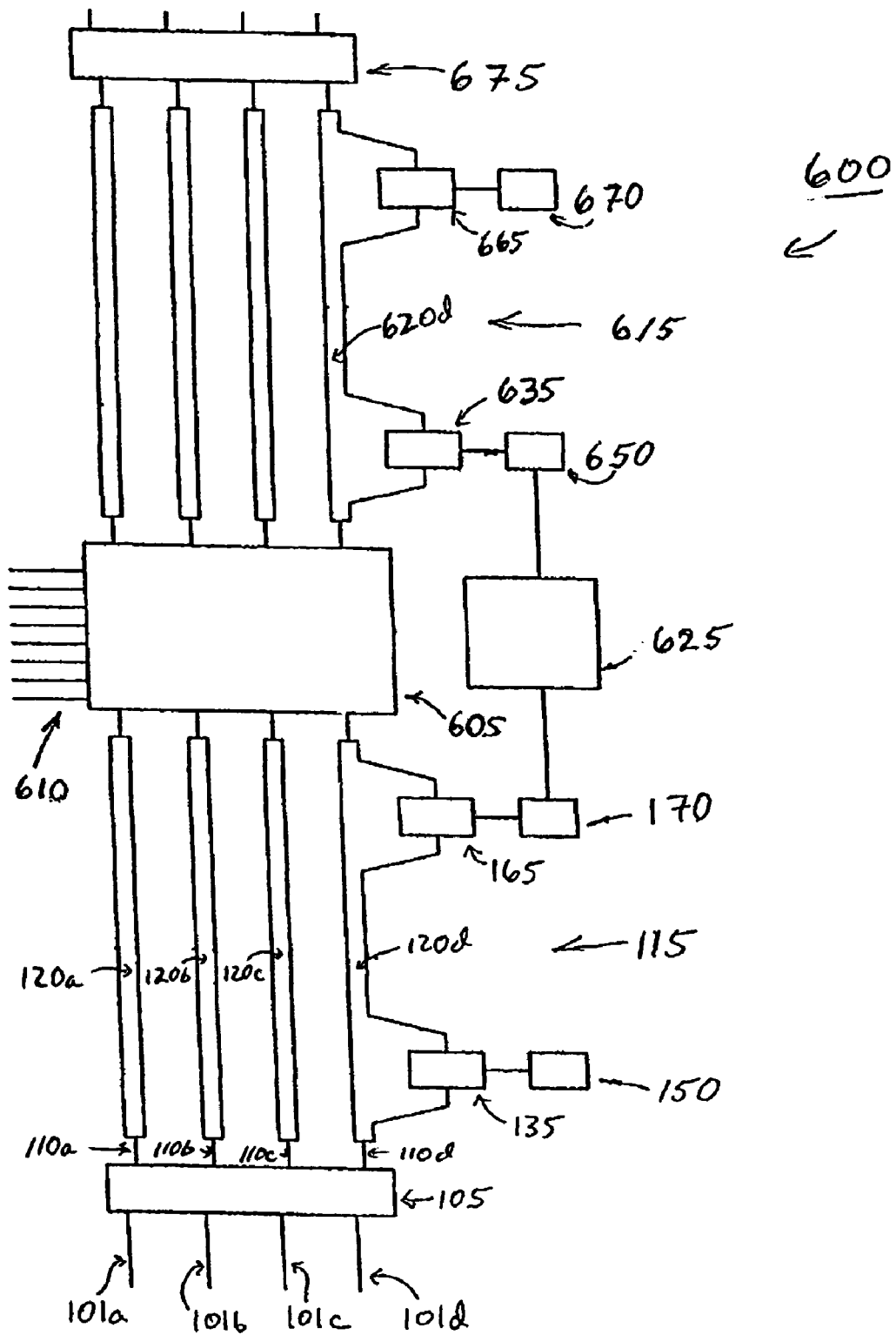
FIG. 6 is a drawing of a two-segment riser set in a high-rise building.

FIG. 6 shows a multiple riser segment, i.e. high-rise electrical distribution system 600 feeding multiple floors in a building. System 600 includes phase conductors 101*a*–101*c*, neutral conductor 101*d*, fuse and switch panel 105, buss bars 110*a*–110*d*, riser set segment 115 including riser segments 120*a*–120*d*, inductive couplers 135 and 165, and communication devices 150 and 170, similar to those described in circuit 100 in FIG. 1. A panel 605 couples power between riser set segment 115 and various loads 610, which are located on a middle floor. Power distribution continues upwards via a riser set segment 615 to panel 675. Similarly to circuit 100, as described in FIG. 1, communication device 150 communicates with communication device 170 via riser segment 120*d* and inductive couplers 135 and 165.

A modem 650 is coupled to an inductive coupler 635, and a modem 670 is coupled to an inductive coupler 665. Modem 650 communicates with modem 670 via a riser segment 620*d*, to which inductive couplers 635 and 665 are coupled. Riser segment 620*d* transmits power to panel 675. Because the loop formed by rise conductor segment 120*d* does not reach panel 675, a repeater 625 is connected between modem 170 and modem 650, and relays data upwards and downwards. Repeater 625 may be any device for coupling a data signal between modems 170 and 650. With this configuration, data transmission can be relayed continuously throughout the building.

In another embodiment, a device such as a repeater can be installed near one or more of the panels, such as panel 605, which may be a switch and fuse box, to facilitate distributing data signals from modem 170 to communications devices on various floors. Switch and fuse panels such as panel 605 can feed numerous floors, typically between about 2 and 4 floors. A suitable device such as an inductive or capacitive coupler is connected to modem 170 and one or more conductors 610 emanating from panel 605. Where panel 605 is an interim power panel followed by further panels such as 675, repeater 625 generates a new signal to carry appropriate portions of the original data to riser segment 620*d* via modem 650 and inductive coupler 635.

In another embodiment, if attenuation is sufficiently low, and data distribution were not needed on the floors served by panel 605, coupler 165 may be connected directly to coupler 635, eliminating the need for repeater 625.

The various arrangements described above are applicable for any of phase, neutral or ground circuits, and do not depend upon the flow of power current or lack thereof. Indeed, parallel conductors used to transmit RF signals may not be power conductors at all. For example, if a multiple conductor cable is used for any other application, and at least one conductor is otherwise unused, it may be connected in parallel with an already used conductor, forming a loop which may be utilized for inductively coupled signals.

An alternative embodiment of the system includes inductive couplers for utilization of underground power cables for signal transmission. One or more of the neutral wires surrounding the underground cable can be utilized for high frequency transmission, while preserving the power conduction function of the selected neutral wire(s).

Figure 7:
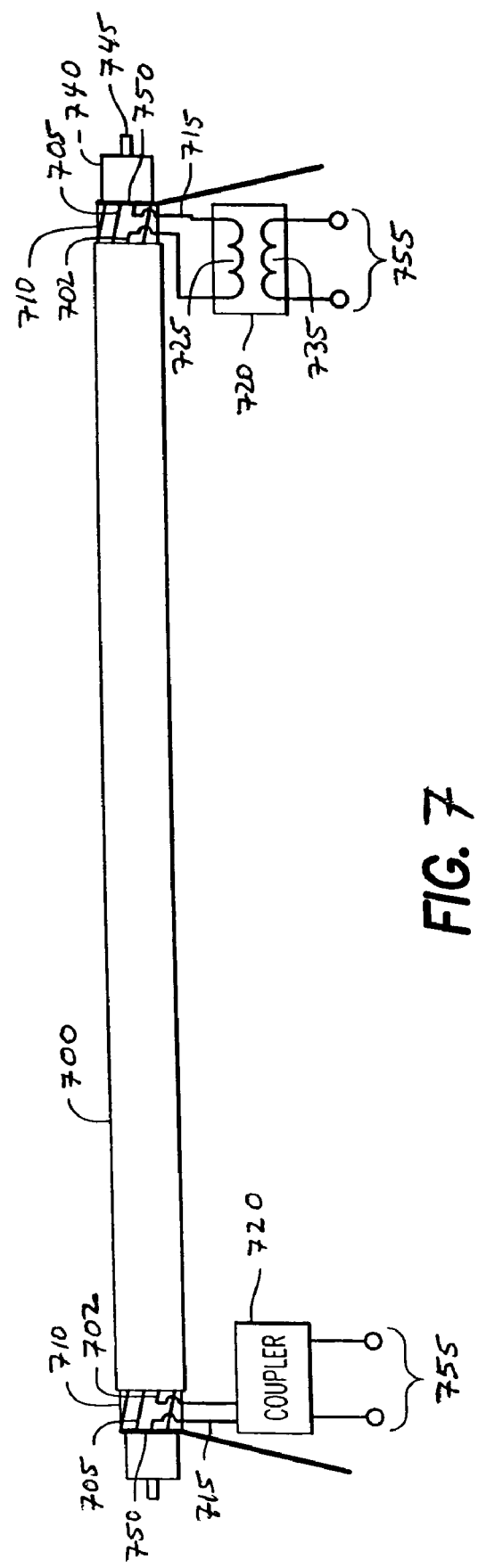
FIG. 7 is an illustration of an arrangement of a single-ended transmission line using a single neutral wire for data communication.

FIG. 7 is an illustration of an arrangement of a single-ended transmission line using a single neutral wire for data communication. A cable 700 includes a multiplicity of neutral conductors 705, e.g. wires wrapped in a gentle spiral around a high voltage insulator 740 and a center phase conductor 745. One selected strand of neutral conductors 705, i.e., neutral conductor 702, is isolated to act as a data transmission line conductor for a data signal.

To implement the arrangement of FIG. 7 in an already-installed underground cable, neutral conductor 702 is selected out of the several neutral conductors 705, and cut in an exposed section 710 at each end of cable 700. A lead 715 of neutral conductor 702 remains connected to a ring 750 at each end of cable 700. Neutral conductor 702 and lead 715 are connected to a first winding 725 of a coupler 720. First winding 725 is thus connected in series between neutral conductor 702 and ground. A second winding 735 of coupler 720 is coupled to a port 755 through which data is transmitted and received. Thus, cable 700 is enlisted for use as a high frequency transmission line, which can be connected to communications equipment such as a modem (not shown), via coupler 720.

Electrically speaking, coupler 720 is a transformer. The impedance across the primary, i.e., first winding 725, of such a transformer is negligible at the frequencies used for conducting power. First winding 725, which is attached to neutral conductor 702 and lead 715, should be wound with a wire at least as thick as that of neutral conductor 702. Under these circumstances, the selected data-carrying neutral conductor 702 has essentially the same impedance as all of the other neutral wires. It would carry essentially the same current as each of the other neutral wires, and the total capacity and surge current capacity of the neutral circuit would not be degraded.

In FIG. 7, the neutral current of the single neutral conductor 702 passes through coupler 720. For a 200 Amp cable with eight neutral wires, the data-carrying wire would carry a maximum steady state current of 25 Amps rms. The maximun steady-state current through a single neutral conductor is less for a smaller ampacity cable and for a cable with a larger number of neutral conductors. Coupler 720 must be capable of handling the flux generated by this current, without magnetic core saturation, in order to carry out its data coupling function.

Neutral conductor 702 carries current in a first direction for a high frequency data signal. The other neutral conductors 705 carry the data signal's return current in the opposite direction, tending to cancel and thus greatly decrease an intensity of the radiated magnetic field due to the modulated data signal. This arrangement also provides an electrostatic shielding effect against noise coupling from an external electric field.

It should be understood that various alternatives, combinations and modifications of the teachings described herein could be devised by those skilled in the art. The present invention is intended to embrace all such alternatives, modifications and variances that fall within the scope of the appended claims.

What is claimed is:

1. A system comprising:
   a first inductive coupler for coupling a data signal between a port of said first inductive coupler and a first subset of a plurality of electrically parallel conductors; and
   a second inductive coupler for coupling said data signal between a port of said second inductive coupler and a second subset of said plurality of conductors.

2. The system of claim 1, wherein said first subset is identical to said second subset.

3. The system of claim 1, wherein said second subset is complementary of said first subset.

4. The system of claim 1, wherein said data signal is carried on a frequency of greater than or equal to 1 MHz.

5. The system of claim 1, wherein said plurality of conductors are for carrying electrical power.

6. The system of claim 1, wherein said plurality of conductors are components of a riser set segment in a building.

7. The system of claim 6,
   wherein said riser set segment is a first riser set segment, and
   wherein said port of said first inductive coupler is coupled to a device for coupling said data signal between said port of said first inductive coupler and a second riser set segment in said building.

8. A system comprising:
   a first inductive coupler installed on a first conductor, for coupling a data signal between a port of said first inductive coupler and said first conductor; and
   a second inductive coupler installed on said first conductor, for coupling said data signal between a port of said second inductive coupler and said first conductor,
   wherein said first conductor is electrically parallel to a second conductor having neither of said first nor second inductive couplers installed thereon.

9. The system of claim 8, wherein said first conductor comprises a plurality of conductors in parallel with each other.

10. The system of claim 8, wherein said data signal is carried on a frequency of greater than or equal to 1 MHz.

11. The system of claim 8, wherein said first and second conductors are for carrying electrical power.

12. The system of claim 8, wherein said first and second conductors are components of a riser set segment in a building.

13. The system of claim 12,
   wherein said riser set segment is a first riser set segment, and
   wherein said port of said first inductive coupler is coupled to a device for coupling said data signal between said port of said first inductive coupler and a second riser set segment in said building.

14. A method comprising:
   installing a first inductive coupler on a first subset of a plurality of electrically parallel conductors, for coupling a data signal between a port of said first inductive coupler and said first subset; and
   installing a second inductive coupler on a second subset of said plurality of conductors, for coupling said data signal between a port of said second inductive coupler and said second subset.

15. The method of claim 14, wherein said first subset is identical to said second subset.

16. The method of claim 14, wherein said second subset is complementary of said first subset.

17. The method of claim 14, wherein said data signal is carried on a frequency of greater than or equal to 1 MHz.

18. The method of claim 14, wherein said first and second conductors are for carrying electrical power.

19. The method of claim 14, wherein said first and second conductors are components of a riser segment in a building.

20. The method of claim 19,
wherein said riser set segment is a first riser set segment, and
wherein said port of said first inductive coupler is coupled to a device for coupling said data signal between said port of said first inductive coupler and a second riser set segment in said building.

21. A method, comprising:
installing a first inductive coupler on a first conductor for coupling a data signal between a port of said first inductive coupler and said first conductor; and
installing a second inductive coupler on said first conductor for coupling said data signal between a port of said second inductive coupler and said first conductor, wherein said first conductor is electrically parallel to a second conductor having neither of said first nor second inductive couplers installed thereon.

22. The method of claim 21, wherein said first conductor comprises a plurality of conductors in parallel with each other.

23. The method of claim 21, wherein said data signal is carried on a frequency of greater than or equal to 1 MHz.

24. The method of claim 21, wherein said first and second conductors are for carrying electrical power.

25. The method of claim 21, wherein said first and second conductors are components of a riser set segment in a building.

26. The method of claim 25,
wherein said riser set segment is a first riser set segment, and
wherein said port of said first inductive coupler is coupled to a device for coupling said data signal between said port of said first inductive coupler and a second riser set segment in said building.

* * * * *

UNITED STATES PATENT AND TRADEMARK OFFICE
CERTIFICATE OF CORRECTION

| | | |
|---|---|---|
| PATENT NO. | : 7,154,382 B2 | Page 1 of 1 |
| APPLICATION NO. | : 10/971412 | |
| DATED | : December 26, 2006 | |
| INVENTOR(S) | : Cern | |

It is certified that error appears in the above-identified patent and that said Letters Patent is hereby corrected as shown below:

On the Title Page, in Column 1, below "Related U.S. Application Data", Line 1, delete Item "(60)" and insert Item -- (63) --, therefor.

In the Specification

In Column 2, Line 54, delete "DESCRIPTION" and insert -- DETAILED DESCRIPTION --, therefor.

In Column 7, Line 41, delete "capacity and" and insert -- ampacity and --, therefor.

In Column 7, Line 47, delete "maximun" and insert -- maximum --, therefor.

Signed and Sealed this
Twenty-fourth Day of May, 2016

Michelle K. Lee
*Director of the United States Patent and Trademark Office*